United States Patent

Traut

[11] Patent Number: 5,371,825
[45] Date of Patent: Dec. 6, 1994

[54] FIBER OPTIC CABLE WITH SURROUND KINGWIRE AND METHOD OF MAKING SAME

[75] Inventor: Richard Traut, Madbury, N.H.

[73] Assignee: Simplex Wire and Cable Company, Portsmouth, N.H.

[21] Appl. No.: 105,100

[22] Filed: Aug. 10, 1993

[51] Int. Cl.⁵ .......................... G02B 6/44; H02G 3/00
[52] U.S. Cl. ...................... 385/109; 385/100; 385/101; 385/103; 385/104; 385/111; 385/112; 385/113; 523/173; 228/173.3; 228/173.4; 174/70 R
[58] Field of Search ............... 385/100, 101, 109, 113, 385/103, 102, 104, 106, 111, 112; 523/173; 29/854, 876, 868, 860, 855, 857, 844, 845, 861; 174/70 R, 72 R, 70 S; 228/173.3, 173.4, 174

[56] References Cited

U.S. PATENT DOCUMENTS

| | | | |
|---|---|---|---|
| Re. 32,293 | 11/1986 | Dey et al. | 385/101 X |
| Re. 34,516 | 1/1994 | Houghton | 385/109 X |
| 4,185,478 | 6/1979 | D'Auria et al. | 385/101 X |
| 4,239,336 | 12/1980 | Parfree et al. | 385/101 X |
| 4,341,440 | 7/1982 | Trezeguet et al. | 385/101 X |
| 4,349,243 | 9/1982 | Amano et al. | 385/101 X |
| 4,422,718 | 12/1983 | Nakagome et al. | 385/109 |
| 4,508,423 | 4/1985 | Winter et al. | 385/101 X |
| 4,647,151 | 3/1987 | Grogl et al. | 385/109 X |
| 4,651,917 | 3/1987 | Gould et al. | 385/109 X |
| 4,836,640 | 6/1989 | Gartside, III et al. | 385/109 |
| 5,187,763 | 2/1993 | Tu | 385/100 |
| 5,218,658 | 6/1993 | Macleod | 385/100 |

*Primary Examiner*—Brian Healy
*Attorney, Agent, or Firm*—Miller & Christenbury

[57] ABSTRACT

A high-strength, waterproof cable capable of transmitting large quantities of information over great distances in a reliable and durable fashion and a method of making the cable is provided. The cable includes a first central core portion having a pair of opposed ends, with each end having a locking surface. The cable further includes a second central core portion having a pair of opposed ends, each end having a locking surface. The second core portion is sealed to the first core portion by engagement of the respective locking surfaces. The sealed first and second core portions form a central core having a hollow interior chamber. A water-blocking material is located in the sealed chamber and an optical fiber array is located in the sealed chamber and embedded in the water-blocking material. A multiplicity of high tensile strength steel wires are helically wrapped around the core and a thermoplastic jacket is positioned outwardly of and surrounding the steel wires.

18 Claims, 5 Drawing Sheets

FIBER OPTIC CABLE WITH SURROUND KINGWIRE AND METHOD OF MAKING SAME

BACKGROUND OF THE INVENTION

The present invention relates to an optical cable, particularly to a hermetically sealed, high-strength, waterproof undersea optical cable and a method of manufacturing the cable.

FIELD OF THE INVENTION

Continued globalization of economic transactions between persons in nations separated by large distances has increased the need for more reliable and cost-effective means of facilitating communications over greater and greater distances. Underwater cables have been used to span the great ocean distances with an ever-increasing degree of success.

However, the exploding volume of communications between parties in many nations, such as voice, fax and data transmissions, has recently caused the need to channel a growing number of communications through a limited number of cables. Fiber optic cables have been a promising answer in this regard because of the large quantity of information that can be conveyed through optical fibers.

Use of optical fibers in the harsh conditions of the undersea environment requires cable designs which provide high strength, low strain and a high degree of protection to the optical fibers. Such cables must be designed for long-term reliability with particular attention to the protection of the optical fibers. Transoceanic fiber optic cables are made in very long lengths, typically several thousand kilometers, and are designed for a high strength to weight ratio to ensure low and acceptable strain on the optical fibers when installed in ocean depths exceeding five kilometers. In addition, the design must provide complete protection of the optical fibers from high hydrostatic water pressure and from ingress of water, hydrogen, etc. Due to the very high costs associated with deep ocean cable repair, as well as the very high reliability requirements, this type of cable requires a design that can readily be manufactured under very high quality controlled conditions.

OBJECTS OF THE INVENTION

It is an object of the invention to provide an undersea cable having high-strength characteristics capable of withstanding initial deployment and long-term environmental stresses.

It is another object of the present invention to provide an undersea cable which is corrosion-resistant and fully protective of an optical fiber array positioned interiorly of the cable.

It is another object of the invention to provide an undersea cable having all of the above characteristics which is capable of cost-efficient production, easy deployment and high durability.

It is a further object of the present invention to provide a method of manufacturing an undersea optical cable having the characteristics specified above.

Other objects and advantages of the present invention will become apparent to those skilled in the art from the drawings, the detailed description of preferred embodiments and the appended claims.

SUMMARY OF THE INVENTION

The present invention provides a high-strength, waterproof cable capable of transmitting large quantities of information over great distances in a reliable and durable fashion. The cable includes a first central core portion having a pair of opposed ends, with each end having a locking surface. The cable further includes a second central core portion having a pair of opposed ends, each end having a locking surface. The second core portion is sealed to the first core portion by engagement of the respective locking surfaces. The sealed first and second core portions form a central core having a hollow interior chamber. A water-blocking material is located in the sealed chamber and an optical fiber array is located in the sealed chamber and embedded in the water-blocking material. A multiplicity of high tensile strength steel wires are helically wrapped around the core and a thermoplastic jacket is positioned outwardly of and surrounding the steel wires. Alternately, a longitudinal continuously welded metal tape may be formed and swaged over the steel wires.

The present invention further includes a method of making the above high-strength, waterproof optical fiber cable. The method includes placing a water-blocking material in between a pair of opposed ends of a first central core portion and laying one or more optical fibers in between the ends and embedding the optical fibers in the water-blocking material. A central core is formed by sealing together locking surfaces of the opposed ends of the first central core portion with locking surfaces at the opposed ends of a second central core portion. A multiplicity of high tensile strength steel wires are then helically wrapped around the outside of the central core and a thermoplastic cover extruded outwardly of and surrounding the high tensile strength steel wires. Alternately, a longitudinal continuously welded metal tape may be formed and swaged down over the steel wires.

DETAILED DESCRIPTION OF THE INVENTION

It will be appreciated that the following description is intended to refer to the specific embodiments of the invention selected for illustration in the drawings and is not intended to define or to limit the invention, other than in the appended claims.

Figure 1:
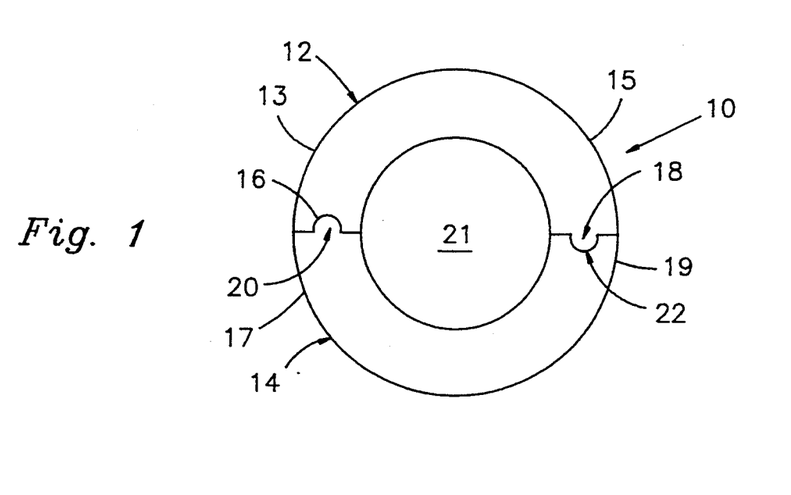
FIG. 1 shows a schematic cross-sectional view of sealed first and second core portions forming a fiber optic cable core member in accordance with the invention.

Turning now to the specific forms of the invention illustrated in the drawings, and referring particularly to FIG. 1, the number 10 designates a central core in accordance with aspects of the invention. Central core 10 is formed from a first central half core 12 and a second central half core 14. First central half core 12 has a pair of opposed ends 13 and 15, while second central half core 14 has a similar pair of opposed ends 17 and 19. Opposed end 13 of first central half core 12 has a rounded locking groove 16 and opposed end 15 has a rounded locking ridge 18 preferably centrally positioned on the end surfaces thereof. Similarly, opposed end 17 of second central half core 14 has a rounded locking ridge 20 and opposed end 19 has a rounded locking groove 22 on the endmost surfaces thereof. Central core 10 has an interiorly disposed hollow chamber 21 and forms the central axis of the cable 24 shown in FIG. 3.

Figure 2:
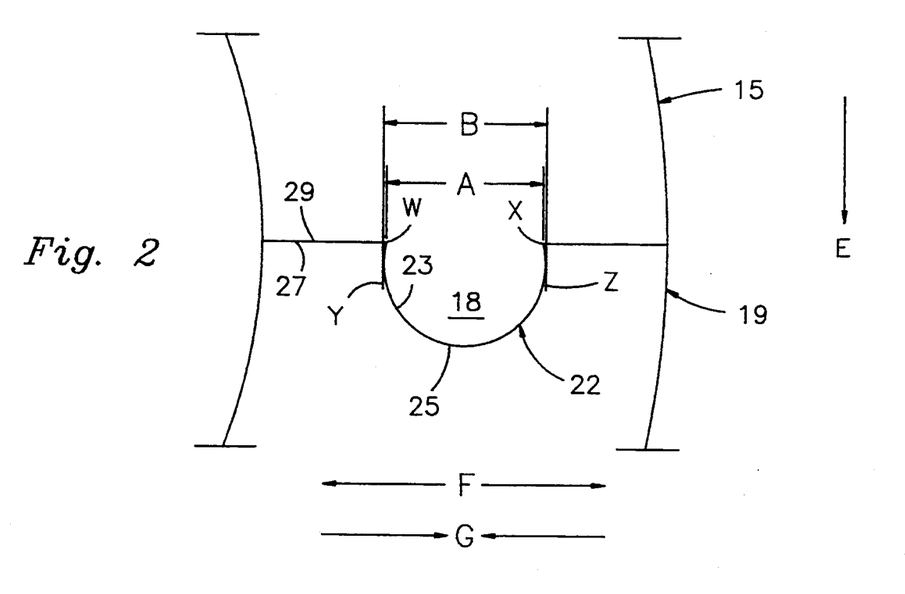
FIG. 2 shows a schematic, exploded cross-sectional view of sealed locking surfaces of the core member from FIG. 1.

FIG. 2 shows an exploded view of a portion of central core 10 from FIG. 1. In particular, the opposed ends 15 and 19, respectively, of first central half core 12 and second central half core 14 are illustrated for ease of understanding of the seal between the opposed ends. Opposed ends 15 and 19 closely contact one another along end surfaces 27 and 29. Also, rounded locking ridge 18 tightly engages rounded locking groove 22 by direct and close contact of ridge locking surface 23 and groove locking surface 25.

Figure 3:
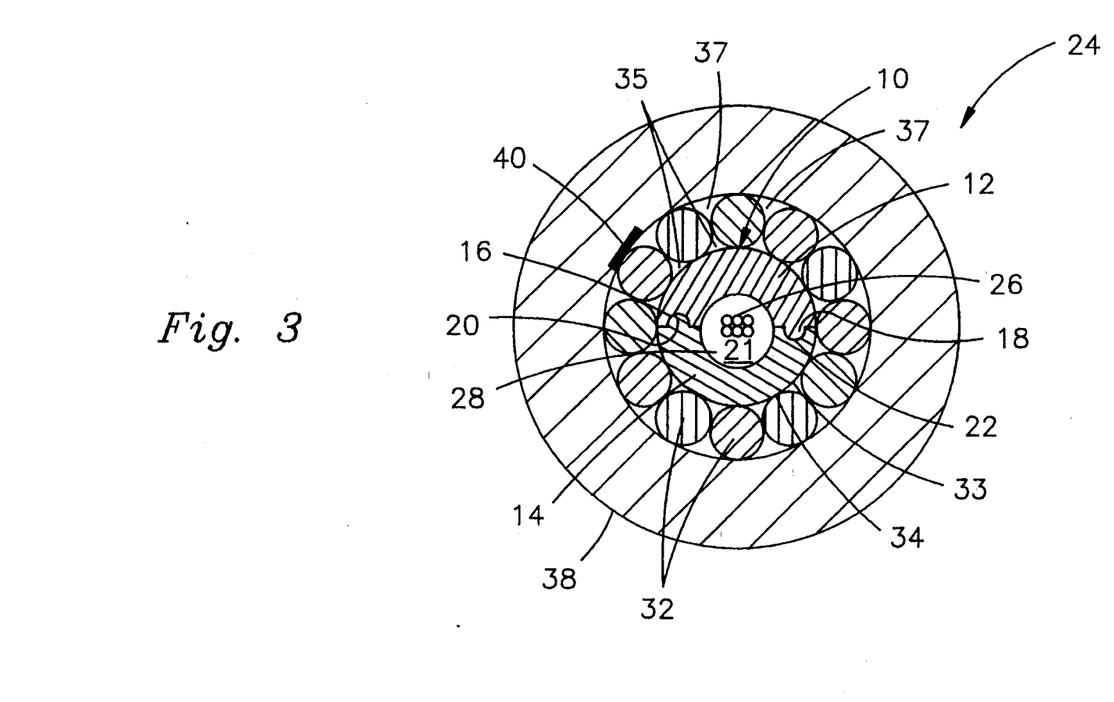
FIG. 3 shows a cross-sectional view of a high-strength, waterproof fiber optic cable in accordance with the invention, including the core member shown in FIG. 1.
Figure 4:
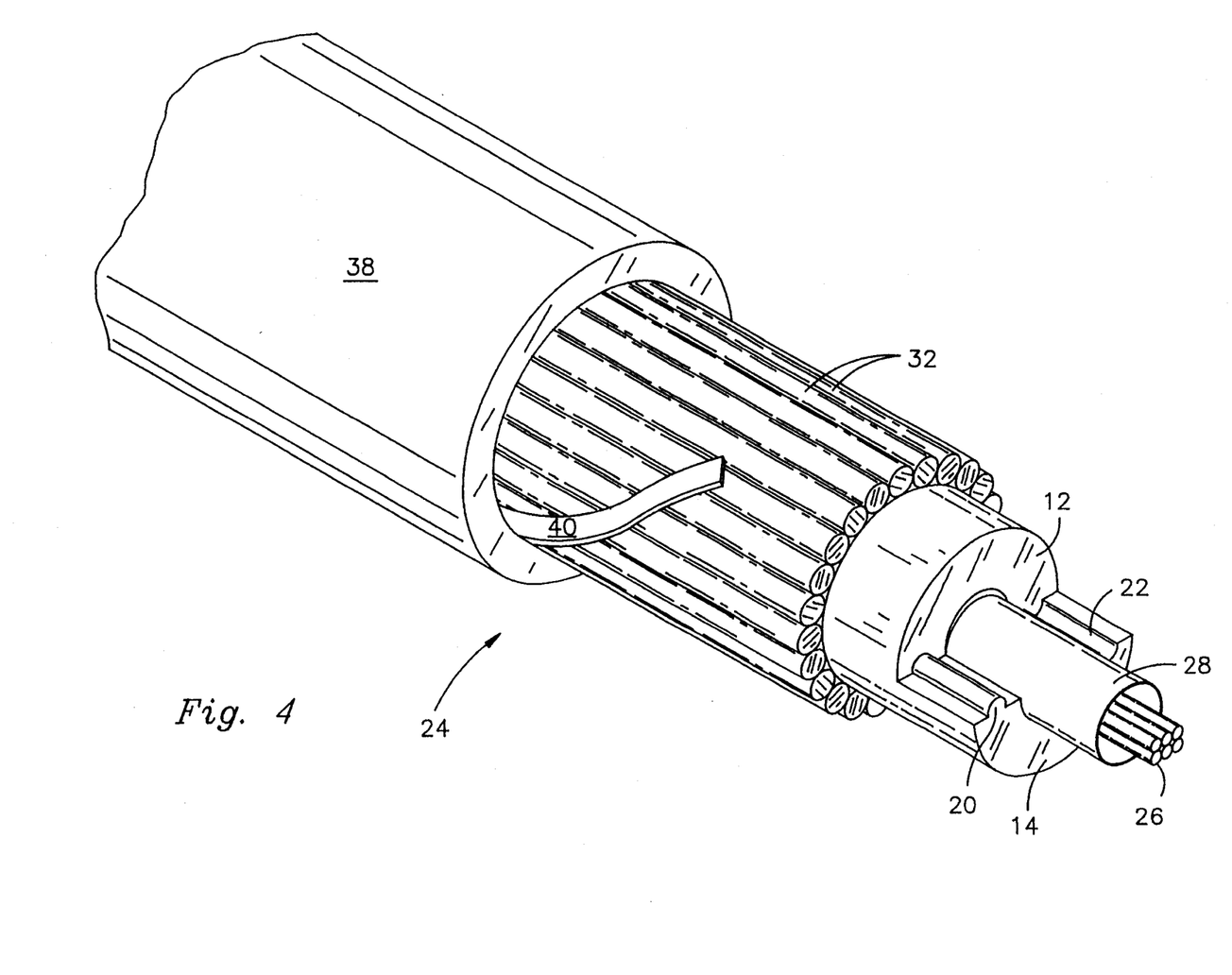
FIG. 4 shows a perspective view of the cable shown in FIG. 3.

FIGS. 3 and 4 illustrate a preferred fiber optic cable 24 in accordance with the invention. A fiber optic array 26 of six optical fibers is positioned within chamber 21. Chamber 21 is also filled with water-blocking material 28. Rounded locking grooves 16 and 22 and rounded locking ridges 18 and 20 seal first and second central half cores 12 and 14 together and assist in maintaining water-blocking material 28 within chamber 21.

High tensile strength steel wires 32 are helically wrapped around central core 10 and have their innermost surfaces 34 embedded into outer surface 33 of central core 10. Interstices 35 and 37 between steel wires 32 are filled with blocking material. Outer jacket 38 surrounds steel wires 32. Also, binder tape 40 is helically wound around steel wires 32 and assists in maintaining steel wires 32 in a desired configuration and location prior to application of outer jacket 38.

Figure 5:
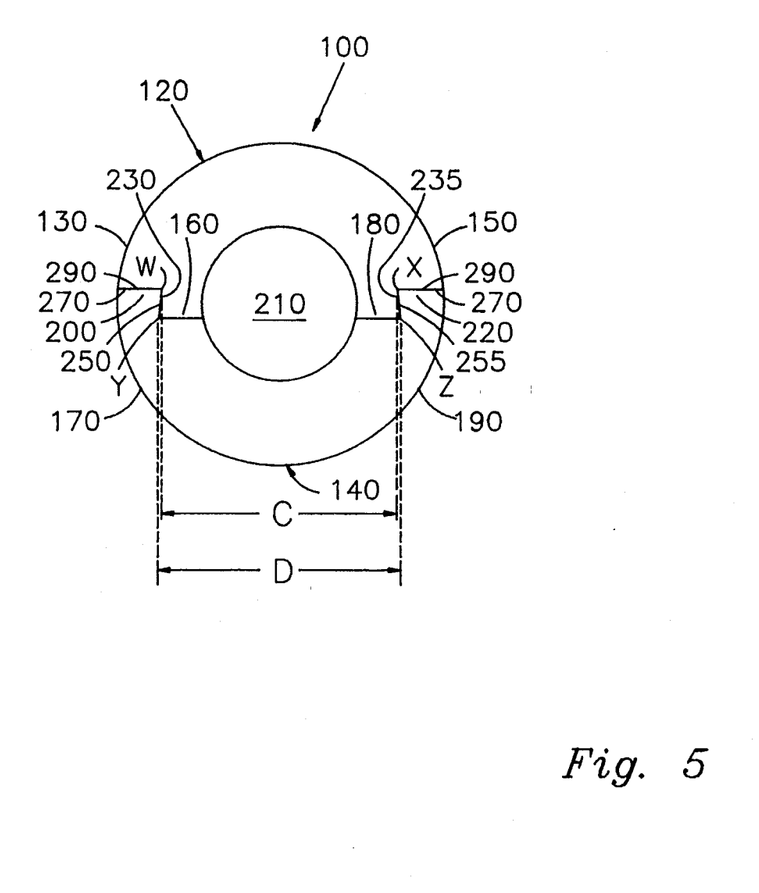
FIG. 5 shows a schematic cross-sectional view of an alternate embodiment of the core member shown in FIG. 1.

FIG. 5 depicts an alternate embodiment of central core 10 which contains the same features as the central core 10 in FIG. 1 except for different locking surfaces on the opposed ends of each central core portion. In particular, FIG. 5 shows central core 100 having first central half core 120 sealed to second central half core 140. First central half core 120 has a pair of opposed ends 130 and 150, while second central half core 140 has a similar pair of opposed ends 170 and 190. Opposed ends 130 and 150 of first central half core 120 have raised locking ribs 160 and 180, respectively. Similarly, opposed ends 170 and 190 of second central half core 140 have raised locking ribs 200 and 220, respectively. End surfaces 290 of opposed ends 130 and 150 closely contact end surfaces 270 of opposed ends 170 and 190 to assist in forming a seal. Interlocking surface 230 of raised locking rib 160 directly and tightly engages outer locking surface 250 of raised locking rib 200. Similarly, interlocking surface 235 of raised locking rib 180 tightly and directly engages outer locking surface 255 of raised locking rib 220. The locked-together first and second central half cores 120 and 140 create an interior chamber 210.

Raised locking ribs 160, 180, 200 and 220 are configured in a manner such that locking surfaces 230, 235 and 250, 255 are at angles other than perpendicular (90°) with respect to end surfaces 290 and 270. For example, the angle between interlocking surface 230 and end surface 290 on opposed end 130 is less than 90°. Similarly, the angle between end surface 270 and outer locking surface 250 of raised locking rib 200 is less than 90°. This causes opposed interlocking surfaces 230 and 235 of raised locking ribs 160 and 180, respectively, to lie in a manner not parallel to one another. This results in points W and X lying radially inwardly of points Y and Z. This further results in the distance between points W and X, as represented by the distance between arrows C, being less than the distance between points Y and Z, which is represented by the distance between the arrows D.

Figure 6:
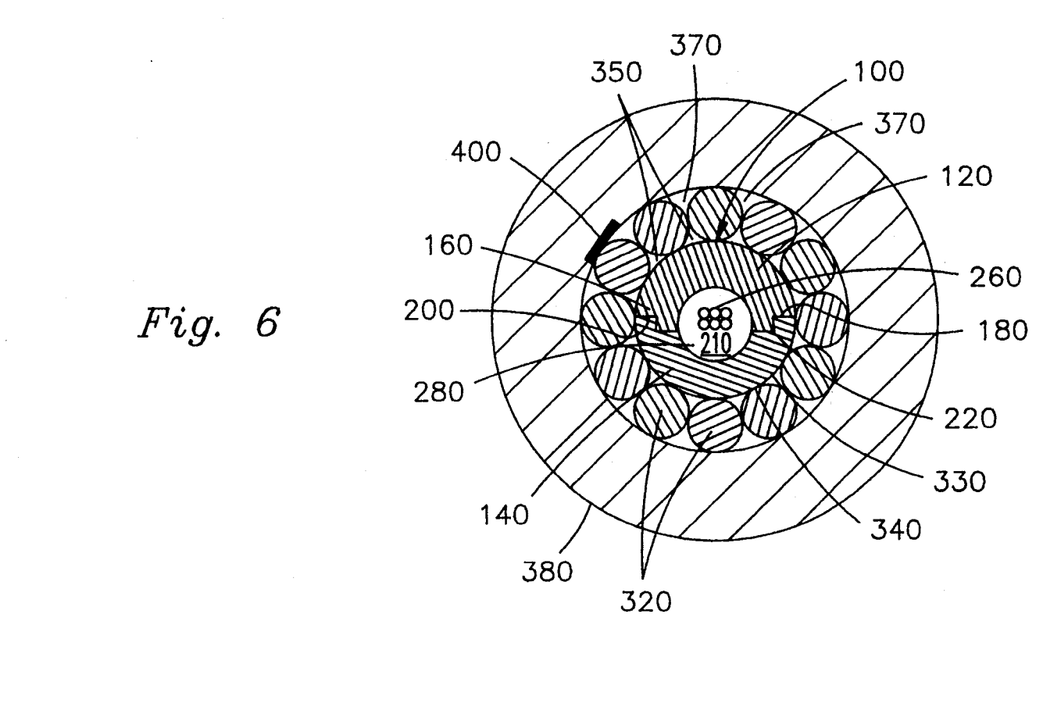
FIG. 6 shows a cross-sectional view of an alternate embodiment of a high-strength, waterproof fiber optic cable in accordance with the invention, including the core member shown in FIG. 4.

FIG. 6 shows an alternate cable formed using alternate central core 100. Chamber 210 of central core 100 is filled with water-blocking material 280 and further contains fiber optic array 260. Raised locking ribs 160, 200 and 180, 220 seal first and second central half cores 120 and 140 together and assist in maintaining water-blocking material 280 within chamber 210. Steel wires 320 are helically wrapped around central core 100 and have their innermost surfaces 340 slightly embedded into outer surface 330 of central core 100. Binder tape 400 is helically wrapped around steel wires 320 to maintain them in a desired position prior to extrusion of outer jacket 380.

The manner in which the cable 24 shown in FIGS. 1–3 is manufactured will now be described. Central core 10 is preferably manufactured from copper, steel or a polymeric material by roller forming or extrusion, as appropriate. Such a roller forming or extrusion operation is preferably a one-step operation which results in a central core component shaped in its final form. Such one-step techniques and the apparatus and dies necessary to perform this step are well known in the art and will not further be discussed herein.

Because of the relatively small size of central core 10, such as 0.119″ in diameter for example, and the associated relatively small sizes of portions of central core 10, such as rounded locking grooves 16, 22 and rounded locking ridges 18, 20, such as 0.01″ diameter, dies typically utilized for the extrusion process are subject to somewhat limited life spans. Therefore, as an alternative, a multiple-step extrusion can be performed wherein opposed ends 13 and 15 are first formed in a configuration wherein the distance therebetween is far greater than the final form shown in central core 10. Then, subsequent steps of mechanical shaping can be applied to the preliminarily formed central core 10 so that opposed ends 13 and 15 are caused to move toward one another, in a step-by-step manner, thereby reducing the distance therebetween to the final desired spacing.

This step-by-step process permits production of a longer central core 10 between maintenance or repair cycles. Also, subsequent forming steps can further shape and design locking grooves 16, 22 and locking ridges 18, 20 to a final desired structural configuration and tolerance level. Other methods of manufacturing or forming central core 10 are possible so long as the appropriate characteristics and close tolerances are maintained. For example, continuous casting processes could be used to form central core 10.

The next step of assembling cable 24 typically lies with the introduction of a water-blocking material (such as Syncofox 280 Deluxe Buffer Water Block) into the space between opposed ends 17 and 19 of second central half core 14 in a continuous fashion. Of course, the quantity of water-blocking material may be pre-metered so that an exact desired quantity of water-blocking material is introduced. Pre-metering enables the operator to avoid excessive material which would be wasted or to apply a deficient amount of material, which would result in air pockets in chamber 21 (once formed)—all to the detriment of fiber optic array 26.

Then, the specific fiber optic array 26 is laid into the space embedded into water-blocking material 28. Fiber optic array 26 is thereby "suspended" or "floated" in a bed of corrosion-resistant material. Of course, the fiber optic array can consist of any desired number of optical fibers and may be introduced either singly or in pre-designed packages.

The next step in the assembly process is an important step wherein central core 10 is formed by first generally aligning first and second central half cores 12 and 14, and then carefully aligning locking ridges 18 and 20 with locking grooves 22 and 16, respectively. Force is then applied to first central half core 12 in the direction shown by the arrow "E" in FIG. 2. Force is typically applied with closing rollers sized for the correct core diameter after sealing. Application of such force causes locking groove 16 and locking ridge 18 to move toward locking ridge 20 and locking groove 22, respectively, such that locking surfaces 23 and 25 contact each other. As shown in FIG. 2, locking, and thus sealing, is caused because the distance between points "W" and "X" as represented by the distance between the arrows "A" is less than the distance between points "Y" and "Z," as represented between the arrows "B." Continued application of force causes locking surface 25 at points "W" and "X" to deflect in the direction shown by the arrows "F" to permit locking ridge 18 to continue movement toward and into locking groove 22. Further continued application of force causes ridge locking surface 23 to move forward and into direct contact with groove locking surface 25.

Once locking ridge 18 is in the desired position inside locking groove 22, a "springing" back effect of opposed end 19 at points "W" and "X" into its original configuration in the direction shown by the arrows "G" causes a tight sealing effect which seals fiber optic array 26 within chamber 21.

The next preferred step in the manufacturing process includes application of a small quantity of water-blocking material 36, in a thin layer over just formed central core 10. Preferably, a uniform layer is applied in sufficient quantity to result in a core 10/blocking material layer diameter equal to design requirements. Water-blocking material 36 may be any number of suitable materials known in the art, although Vistanex LN polyisobutylene (manufactured by Exxon Corp.) is preferred. This is followed by helical wrapping of steel wires 32 about central core 10 and the thin layer of blocking material 36. Twelve 0.0742" HTS wires 32 are wrapped at 9.0 LH lay, K=99%, angle=5.8°, for example. Steel wires 32 are preferably tightly bound around central core 10 with a sizing die which results in slight embedding of the innermost surfaces 34 of steel wires 32 into surface 33 of central core 10. Slightly embedding steel wires 32 into surface 16 of central core 10 helps eliminate springiness and internal tension in the resulting cable 24. Tight binding further causes the thin layer of blocking material 36 to travel or flow into the internal interstices 35 and 37 between steel wires 32. The steel strand wire package covering the core may, in the alternative, by any one of a number of designs well known or contemplated in the art. A further thin layer of water-blocking material 36 is preferably applied to the exterior of, steel wires 32 so that interstices 37 are fully filled and air pockets completely purged.

A strand of binder tape 40 is then wound around steel wires 32 in a preferred configuration in order to maintain steel wires 32 in place prior to application of outer jacket 38. One preferred structure is a band of HTS steel tape, sized at 0.005"×0.25" with 100% tape width gap at 60° angle RHL. Alternately, the steel wire structure may be covered by a longitudinal continuously welded metal tape which is formed, welded and swaged into the surface of the steel wires. In such a case, binder tape 40 is not required.

Subsequent to application of binder tape 40, outer jacket 38 is then applied over the thin layer of blocking material 36. Outer jacket 38 is typically made from a tough cut-resistant thermoplastic material. Application of outer jacket 38 may be performed in any manner known in the art, either as a separate subsequent step from the helical winding of steel wires 32 and binder tape 40, or immediately following in a "caging" operation. The preferred manner of application of outer jacket 38 is by extrusion. For example, a preferred jacket 38 is 0.1135" thick MDPE coated to result in a final cable diameter of 0.6"±0.01".

The resulting cable 24 is an extremely high-strength cable, having a nominal breaking strength of 15,000 lbs., which is waterproof and highly corrosion-resistant and protective of fiber optic array 26.

Although this invention has been described in connection with specific forms thereof, it will be appreciated that a wide array of equivalents may be substituted for the specific elements shown and described herein without departing from the spirit and scope of this invention as described in the appended claims.

For example, central core 100, as illustrated in FIG. 5, may be substituted for central core 10 of FIG. 1. Similarly, alternate fiber optic arrays 26, single fiber optical fibers and the like may be introduced into chambers 21 and 210. It is highly desirable to have first central half core 12 and second central half core 14 made from the same material. Thus, central core 10 may be made from a number of conductive materials such as steel, copper, aluminum, copper-clad aluminum and the like or a nonconductive material such as a thermoplastic or thermosetting polymeric material, well known in the art, for example. Nylon is an especially preferred non-conductive material. Also, the non-conductive material can be a composite of polymeric material and high strength metal fibers, glass, graphite, titanium particles, aramid fibers and the like to achieve particular desired characteristics.

First and second half cores 12 and 14 may or may not be equally proportioned. For example, first half core 12 can be larger than second half core 14 such that first half core 12 occupies 60 to 80% of core 10. Further, first and second half cores 12 and 14 may have basic shapes other than the semi-circular shapes shown in the drawings. For example, they may have a true "U" shape or they can be different from one another so long as the proper locking surfaces are preserved.

Also, a wide variety of water-blocking materials may be used, although thixotropic, non-out gels are preferred. Further, a wide number of steel wires 32 may be used so long as high tensile strengths are maintained. It is further possible to substitute other high tensile strength materials for steel wire. For example, aramid fibers, such as KEVLAR ® (manufactured by the DuPont Company) may be used in a wide variety of configurations such as in fiber bundles, rovings and the like. Such alternate materials can be added to supplement steel wires 32 if desired. Further, a wide variety of materials may be used for outer jacket 38, although polyethylene is preferred. Among polyethylenes, high or medium density polyethylenes are especially preferred. Binder tape 40 can be made from any number of materials with varying shapes and sizes to fit the particular need of the assembly process.

Cable 24 may include additional layers/components in various shapes and sizes and made from materials known in the art as prescribed for a particular task. Also, layers may be applied at varying angles and with different spacings to coverages as needed. Further, other shapes, sizes and configurations of locking means may be substituted for those shown in FIGS. 1 and 5 so long as the locking mechanism for sealing first and second central core portions together is employed.

What is claimed is:

1. A high-strength, waterproof cable comprising:
    a first central core portion having opposed end portions and an axis extending longitudinally thereof, each end portion having a sealing surface, said sealing surfaces having at least one pair of locking surfaces, said pair including a proximal locking surface and a distal locking surface, said distal locking surface being positioned further from said axis than said proximal locking surface;
    a second central core portion having opposed end portions and an axis extending longitudinally thereof, each end portion having a sealing surface, said sealing surfaces having at least one pair of locking surfaces, said pair including a proximal locking surface and a distal locking surface, said second central core portion being sealed to said first central core portion by sealing engagement of at least one pair of locking surfaces of said first central core portion with at least one pair of locking surfaces of said second central core portion wherein the distance between a proximal locking surface of one pair of locking surfaces of said first central core portion and a distal locking surface of another pair of locking surfaces of said first central core portion is less than the distance between a proximal locking surface of one pair of locking surfaces of said second central core portion and a distal locking surface of another pair of locking surfaces of said second central core portion, said first and second central core portions forming a central core and a sealed chamber interiorly thereof;
    a blocking material located in said chamber;
    one or more optical fibers located in said chamber and embedded in said blocking material;
    one or more high tensile strength members positioned outwardly of said central core; and
    a cover layer positioned outwardly of and surrounding said strength members.

2. The cable defined in claim 1 wherein said first and second central core portions are electrically conductive.

3. The cable defined in claim 1 wherein said first and second core portions are locked together and sealed in position by application of compressive force exerted by said opposed locking surfaces.

4. The cable defined in claim 1 wherein said strength members comprise a multiplicity of steel wires helically wrapped around said core and said sealing member.

5. The cable defined in claim 1 further comprising a layer of binder material helically wrapped around said strength members.

6. The cable defined in claim 4 wherein said steel wires are partially embedded in said central core.

7. The cable defined in claim 4 further comprising blocking material located between interstices of said steel wires.

8. The cable defined in claim 1 wherein said core portions are further sealed together by diffusion bonding.

9. A high-strength, waterproof undersea optical cable comprising:
    an electrically conductive first central core portion having opposed end portions, each end portion having a sealing surface with one or more sets of locking surfaces, each set having a distal and a proximal locking surface;
    an electrically conductive second central core portion having opposed end portions, each end portion having a sealing surface with one or more sets of locking surfaces, each set having a distal and a proximal locking surface, said second central core portion being sealed to said first central core portion by sealing engagement of at least one set of locking surfaces of the end portions of said second central core portion wherein the distance between a proximal locking surface of one set of locking surfaces of said first central core portion and a distal locking surface of another set of locking surfaces of said first central core portion is less than the distance between a proximal locking surface of one set of locking surfaces of said second central core portion and a distal locking surface of another set of locking surfaces of said second central core portion, said first and second central core portions forming a central core and a sealed chamber interiorly thereof;
    a water blocking material located in and filling said chamber;
    one or more optical fibers located in said chamber and surrounded by said water blocking material;
    a multiplicity of high tensile strength steel wires helically wrapped around and positioned outwardly of said central core; and
    a waterproof thermoplastic cover positioned outwardly of and surrounding said steel wires.

10. A method of making a high-strength, waterproof cable comprising:
    forming a first central core portion having an axis and opposed ends wherein each end has a sealing surface, said sealing surfaces having at least one pair of locking surfaces, said pair including a proximal locking surface and a distal locking surface, said distal locking surface being positioned further from said axis than said proximal locking surface;
    forming a second central core portion having an axis and opposed ends wherein each end has a sealing surface said sealing surfaces having at least one pair of locking surfaces, said pair including a proximal locking surface and a distal locking surface, said distal locking surface being positioned further from said axis than said proximal locking surface;

embedding one or more optical fibers in said blocking material;

placing a blocking material between opposed ends of either or both of said central core portions;

sealing said first central core portion to said second central core portion by engaging at least one pair of locking surfaces of the end portions of said second central core portion wherein the distance between a proximal locking surface of one pair of locking surfaces of said first central core portion and a distal locking surface of another pair of locking surfaces of said first central core portion is less than the distance between a proximal locking surface of one pair of locking surfaces of said second central core portion and a distal locking surface of another pair of locking surfaces of said second central core portion, to thereby form a central core and a sealed chamber containing said blocking material and said optical fibers interiorly thereof;

positioning one or more high tensile strength members outwardly of said central core; and positioning a cover outwardly of and surrounding said strength members.

11. The method defined in claim 10 wherein said steps of forming said first and second central core portions comprises extruding said central core portions.

12. The method defined in claim 10 wherein said step of positioning said cover comprises extruding said cover over said high tensile strength members.

13. The method defined in claim 10 wherein said step of positioning said high tensile strength members comprises helically wrapping a multiplicity of steel wires around said central core.

14. The method defined in claim 10 further comprising helically wrapping binder tape around said high tensile strength members.

15. The method defined in claim 10 wherein said step of sealing said first and second core portions together comprises aligning opposed locking surfaces of said first core portion with opposed locking surfaces of said second core portion and applying force to one of said core portions to cause said locking surfaces to engage and seal said core portions together.

16. The cable defined in claim 1 wherein said first and second central core portions comprise a material selected from the group consisting of steel, copper, aluminum and copper-clad aluminum.

17. The cable defined in claim 1 wherein said first and second central core portions comprise a material selected from the group consisting of thermoplastic polymers and thermosetting polymers.

18. The cable defined in claim 17 wherein said first and second central core portions further comprise a filler material selected from the group consisting of metal fibers, glass particles or fibers, graphite, titanium particles and aramid fibers.

* * * * *